United States Patent
Wada et al.

(10) Patent No.: US 7,733,589 B2
(45) Date of Patent: Jun. 8, 2010

(54) ALTERNATE CYLINDER TABLE TO IMPROVE ADJACENT TRACK INTERFERENCE PROBLEM

(75) Inventors: Toshiaki Wada, Kanagawa (JP);
Kazunari Tsuchimoto, Kanagawa (JP);
Kaoru Umemura, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1205 days.

(21) Appl. No.: 11/303,771

(22) Filed: Dec. 15, 2005

(65) Prior Publication Data
US 2006/0132954 A1 Jun. 22, 2006

(30) Foreign Application Priority Data
Dec. 22, 2004 (JP) ............................. 2004-370319

(51) Int. Cl.
*G11B 5/09* (2006.01)
(52) U.S. Cl. ......................................... 360/48
(58) Field of Classification Search ...................... None
See application file for complete search history.

(56) References Cited

U.S. PATENT DOCUMENTS
6,078,452 A * 6/2000 Kittilson et al. ............... 360/51
2004/0193798 A1* 9/2004 Kuwamura ................. 711/114

FOREIGN PATENT DOCUMENTS
JP 03-203071 9/1991
JP 2004-273060 9/2004

* cited by examiner

*Primary Examiner*—Daniell L Negrón
(74) *Attorney, Agent, or Firm*—Townsend and Townsend and Crew LLP; Patrick Duncan

(57) ABSTRACT

Embodiments of the invention prevent data loss due to very frequent writing onto adjacent data tracks. In one embodiment, an alternate zone made up of multiple adjacent data tracks is formed by setting data tracks whose usage is to be prohibited for every other data track. The data updated very frequently and data not updated too frequently are recorded in the alternate zone. Data tracks for recording the data updated very frequently, and data tracks for recording data not updated too frequently, each have one cylinder of spacing. Data loss due to leakage fluxes can thus be prevented.

21 Claims, 6 Drawing Sheets

Circumferential direction of disk (A)

Radial direction of disk (B)

Fig. 5

| Absolute address | Flag | Logical address |
|---|---|---|
| # 0 |  | # 0 |
| # 1 | V |  |
| # 2 |  | # 1 |
| # 3 | V |  |
| # 4 |  | # 2 |
| # 5 | V |  |
| # 6 |  | # 3 |
| # 7 | V |  |
| # 8 |  | # 4 |
| # 9 | V |  |

(A)                (B)

ALTERNATE CYLINDER TABLE TO IMPROVE ADJACENT TRACK INTERFERENCE PROBLEM

CROSS-REFERENCES TO RELATED APPLICATIONS

This application claims priority from Japanese Patent Application No. JP2004-370319, filed Dec. 22, 2004, the entire disclosure of which is incorporated herein by reference.

BACKGROUND OF THE INVENTION

The present invention relates to a technique for preventing the occurrence of an event in which the data pre-recorded on the data tracks of a magnetic disk drive is lost by data writing onto data tracks adjacent to the foregoing tracks.

The magnetic disk of a magnetic disk drive that is a recording medium has multiple data tracks set by servo data concentrically on the recording faces of the disk, and multiple data sectors (hereinafter, referred to simply as sectors) are set in a circumferential direction on each data track. The sectors become the minimum unit of the data recorded on the magnetic disk, and are set as, for example, 512-byte storage blocks. Each data track is arranged on the magnetic disk in a radial direction thereof at a required track pitch, and the magnetic disk drive, after receiving a command from a host apparatus, positions an associated magnetic head at the data track including the sectors of a specified address.

In recent years, with the improvement of magnetic disks in recording density, track pitch density (the number of tracks per inch, TPI) has become increasingly small. Accordingly, the event that since magnetic flux leakage from a write head during data recording on a data track affects the data pre-recorded on adjacent data tracks, an increase in the updating frequency of the data recorded on that track eventuates in the pre-recorded data being lost or becoming unreadable, is occurring in the magnetic disk drives used for specific purposes. This event is known as adjacent-track interference (ATI). Patent Document 1 (Japanese Patent Laid-Open No. 2004-273060) discloses a technique in which, as summarized in the "Abstract" thereof, even if the situation arises that leakage fields progressively erase data present on adjacent data tracks, this situation is compensated for to prevent a data error from occurring in the magnetic disk drive.

The technique described in Patent Document 1 employs the steps of counting the number of writing operations on a data track, detecting that the writing operations count has reached a predefined value, temporarily reading the data on data tracks adjacent to that data track, and rewriting data onto the adjacent data tracks. Also, when data is written onto data tracks, writing of the data skips alternate physical data tracks, and completion of writing onto half of all data tracks is followed by writing onto the skipped data tracks.

Patent Document 2 (Japanese Patent Laid-Open No. Hei 3-203071) discloses a technique in which, since a magnetic disk, because of its circumferential velocity, is smaller in TPI margin at its outer data track than at its inner data tracks, the TPI margin is made constant over the entire magnetic disk surface. More specifically, in order to ensure higher recording density, servo signals are written so that the data track pitch continuously changes to be wider as the data tracks are more distant from the inner edge of the magnetic disk.

BRIEF SUMMARY OF THE INVENTION

In recent years, the purposes of use of magnetic disk drives have been expanding and the forms of data recording in host apparatus have also been diversified. In some specific types of host apparatus, the majority of data recorded on their magnetic disks is used only as the data to be read, and is not updated for long periods of time. Also, only very small portions of the data recorded on specific data tracks are updated with high frequency. These tendencies also apply to, for example, the magnetic disk drives mounted in car navigation systems. In such a magnetic disk drive, a large portion of data within the storage region of the magnetic disk is accounted for by map information not updated, and data is frequently written onto portions of data tracks to register destinations and on-the-route passage locations. Additionally, in a surveillance camera system, stationary image data that has been recorded on its magnetic disk may be affected by ATI if time-stamp data is frequently updated without the stationary image data being updated over a long period of time. Furthermore, in the magnetic disk drives used for POS (Point Of Sale), a similar event also occurs since product data not updated for a long period and the purchasing data frequently updated are recorded.

These pieces of host apparatus tend to continue using the same data tracks to write and update data higher in the frequency of updating, and these data tracks are usually adjacent to data tracks lower in the frequency of data updating. For these reasons, ATI occurs more frequently for data lower in the frequency of updating, and this gradually increases a soft-error rate (SER) associated with the reading of the data and map information, thus eventuating in the data becoming unreadable.

For magnetic disk drives applicable to the host apparatus employing such special forms of recording, minimizing design changes from the magnetic disk drives used for general purposes creates greater advantages in terms of costs. In addition, the regions on a magnetic disk where a data track for recording the data updated very frequently and a data track for recording data not updated too frequently are arranged adjacently to each other, vary in format, even between the pieces of host apparatus that take such special forms of recording. It is therefore desirable that such economical and physical diversity be accommodatable as flexibly as possible.

A feature of the present invention is to provide a magnetic disk drive capable of preventing the occurrence of an event in which the data pre-recorded on the data tracks of the magnetic disk drive is lost by data writing onto data tracks adjacent to the foregoing tracks. Another feature of the present invention is to provide a data-recording method for preventing the occurrence of an event in which the data pre-recorded on the data tracks of the magnetic disk drive is lost by data writing onto data tracks adjacent to the foregoing tracks. Yet another feature of the present invention is to realize such a magnetic disk drive and recording method easily and flexibly.

A first aspect of the present invention provides a magnetic disk drive for use with a host apparatus in which data of low updating frequency and data of high updating frequency are recorded. The magnetic disk drive comprises a magnetic disk with a data track group including a plurality of data tracks arranged adjacently to one another, from the innermost data track to the outermost data track; a look-up table having an alternate zone formed on the magnetic disk drive by setting usage prohibition for every other data track with respect to the plural adjacent data tracks selected from the data track group; and a processor that refers to the look-up table, skips the usage-prohibited data tracks by executing a write command sent from the host apparatus in order to record the data of low updating frequency, and a write command sent from the host apparatus in order to record the data of high updating frequency, and writes the data of low updating frequency and the data of high updating frequency onto data tracks of the alternate zone.

The alternate zone is formed by flag setup in the look-up table. The look-up table can be constructed as an alternate cylinder table. The alternate zone is constructed of adjacent plural data tracks, and use of alternate data tracks inside the zone is prohibited. Even when data not updated too frequently and the data updated very frequently are recorded in the alternate zone, since no data is recorded on the usage-prohibited data tracks, a data track on which the data of low updating frequency has been recorded, and a data track on which the data of high updating frequency has been recorded, do not become adjacent to each other. Addresses of the data of high updating frequency, on the magnetic disk, are managed by the host apparatus so that the data is recorded in the alternate zone. The data of low updating frequency needs only to be recorded in the alternate zone or on data tracks other than those of the alternate zone, and does not require address management.

Setting up the alternate zone in the neighborhood of the outermost data track or of the innermost data track provides adaptability to a host apparatus that employs either of the above-mentioned special forms of recording. The alternate zone may be constructed as a plurality of adjacent data tracks or as a plurality of adjacent cylinders. The types of host apparatus that allow the present invention to utilize its advantageous effects include car navigation systems, POS systems, or surveillance camera systems.

A second aspect of the present invention provides a magnetic disk drive for use with a host apparatus in which data of low updating frequency and data of high updating frequency are recorded. The magnetic disk drive comprises a magnetic disk with a plurality of data tracks each having an absolute address allocated in order of physical arrangement; an alternate cylinder table having blind tracks generated by, with respect to absolute addresses of the data tracks, setting up a flag for every other absolute address; a recording medium for storing said alternate cylinder table; and a processor that refers to the flag set up in said alternate cylinder table, skips the blind tracks by executing a write command sent from the host apparatus in order to record the data of low updating frequency, and a write command for recording the data of high updating frequency, and writes the data of low updating frequency and the data of high updating frequency onto data tracks of the alternate zone.

A third aspect of the present invention provides a recording method in which a host apparatus records data of low updating frequency and data of high updating frequency in a magnetic disk drive. The recording method comprises a step of setting up an alternate zone in which data tracks for recording data in part of a storage region on a magnetic disk of the magnetic disk drive, and blind tracks not used for data recording are arranged, one by one, in alternate positions; a first recording step of writing the data of low updating frequency onto data tracks of the alternate zone by executing, while skipping the blind tracks, a write command sent from the host apparatus in order to record the data of low updating frequency; a second recording step of writing the data of high updating frequency onto other data tracks of the alternate zone by executing, while skipping the blind tracks, a write command sent from the host apparatus in order to record the data of high updating frequency.

The present invention makes it possible to provide a magnetic disk drive capable of preventing the occurrence of an event in which the data pre-recorded on the data tracks of the magnetic disk drive is lost by data writing onto data tracks adjacent to the foregoing tracks. The present invention also makes it possible to provide a data-recording method for preventing the occurrence of an event in which the data pre-recorded on the data tracks of the magnetic disk drive is lost by data writing onto data tracks adjacent to the foregoing tracks. In addition, the present invention makes it possible to realize such a magnetic disk drive and recording method easily and flexibly.

BRIEF DESCRIPTION OF THE DRAWINGS

FIG. 5 is a view showing an example of an alternate cylinder table configuration.

DETAILED DESCRIPTION OF THE INVENTION

Principles of Occurrence of ATI

Figure 1:
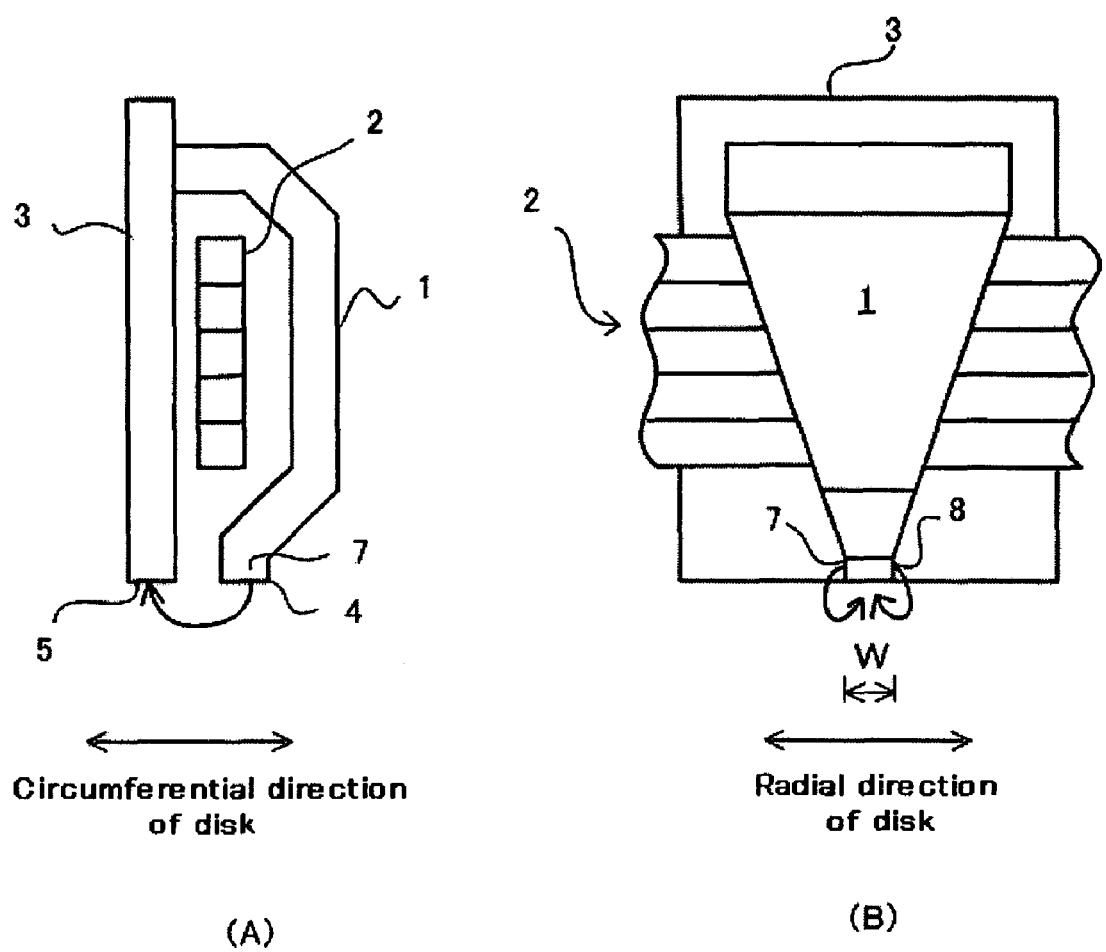
FIG. 1 is a diagram explaining how ATI occurs.

The principles of occurrence of ATI are described below referring to FIG. 1. Throughout this Specification, the same reference number is assigned to the same element. FIG. 1 is a view schematically showing an inductive write head formed on a slider. The horizontal direction shown in FIG. 1(A) denotes a circumferential direction of the magnetic disk existing when the slider flies over the magnetic disk, or a data-recording direction on one data track. FIG. 1(B) is a side view of FIG. 1(A), and the horizontal direction shown in FIG. 1(B) denotes a radial direction of the magnetic disk existing when the slider flies over the magnetic disk, or a direction in which data tracks are arrayed adjacently to one another in a concentric form.

The write head is constructed of an upper magnetic pole piece 1, a lower magnetic pole piece 3, and a coil 2, and formed on the slider. The upper magnetic pole piece 1 and the lower magnetic pole piece 3 are both formed of a magnetic material. Supplying a recording current to the coil 2 produces a flow of a magnetic flux into a magnetic path formed by the upper magnetic pole piece 1 and the lower magnetic pole piece 3. Between an end 4 of the upper magnetic pole piece 1 and an end 5 of the lower magnetic pole piece 3, the magnetic flux flows through a space, and data tracks of the magnetic disk are arranged so that the space through which the magnetic flux flows is positioned above or under each data track. Thus, a magnetic layer is magnetized and data is recorded. Width W of the end 4 of the upper magnetic pole piece 1 is selected so that the data recorded will stay within a width of the data track. Reduction in data track pitch reduces width W of the end 4. However, since the recording current for writing data onto the magnetic layer cannot be reduced too significantly, the magnetic flux saturates near the end 4 of the upper magnetic pole piece 1 and leaks from lateral ends 7 and 8 of the upper magnetic pole piece 1. Accordingly, portions of the magnetic flux are released into a space and as a result, the quantity of so-called leakage flux increases.

The leakage flux also acts on data tracks adjacent to the data track at which the write head is positioned for data recording, and thus changes a magnetized state of an edge portion of each adjacent data track. This quantity of leakage flux, however, seldom causes ATI to become a problem under normal operating conditions of the magnetic disk drive. That is because the quantity of leakage flux is, in itself, smaller than the quantity of main magnetic flux flowing between the ends 4 and 5, used to record data, or because a measure such as providing a guard band between data tracks or appropriately selecting a coercivity of the magnetic layer, is taken. Also, provided that the data pre-recorded on the data tracks affected is updated with suitable frequency, since the effects of the leakage flux that already exist up to that time can be reset during the updating operation, there is almost no problem if the host apparatus is of a general-purpose type such as personal computer.

The above, however, does not apply if the magnetic disk drive is used in such a host apparatus as employing a special recording form in which the data frequently updated is recorded on one of the two adjacent data tracks and data not updated over a long period of time is recorded on the other adjacent data track. In such a form of use, each time data is recorded on one of the two data tracks, the data on the other data track is affected by the leakage flux. Also, as one data track increases in the number of data updating operations, the data read out from the other data track increases in SER. Accordingly, when, before the number of data updating operations on one data track reaches about one million, the data recorded on the other data track is not updated, this results in the data of the other data track not being readable for practical use.

Block Diagram of Magnetic Disk Drive

Figure 2:
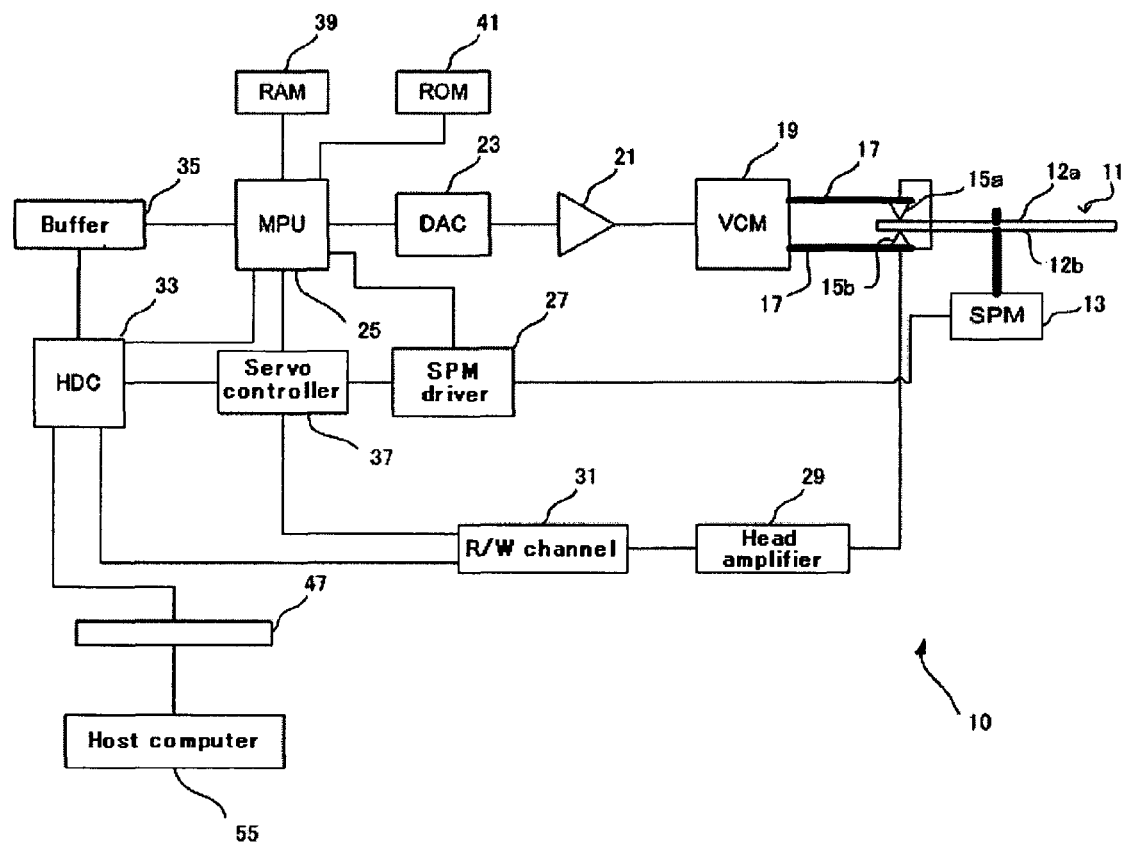
FIG. 2 is a block diagram showing the schematic configuration of the magnetic disk drive according to an embodiment of the present invention.

A schematic configuration of a magnetic disk drive 10 according to an embodiment of the present invention is described below with reference to FIG. 2. A magnetic disk 11 as a magnetic recording medium has, on both upper and lower faces thereof, a recording face 12*a*, 12*b*, with a magnetic layer formed thereon. The magnetic disk is installed at an upper section of a spindle hub, and the disk rotates by means of a spindle motor 13. A formatting pattern of the recording face 12*a* of the magnetic disk 11 is shown in FIG. 3(A). On the recording face 12*a* of the magnetic disk, a plurality of data tracks 101 are defined concentrically by servo data, as shown in FIG. 3(A).

The magnetic disk drive 10 employs a data surface-servo-driving scheme, and when a plurality of recording faces are present on the magnetic disk, each recording face is of the same construction. Servo data is pre-written on each of the plural servo sectors 103 formatted radially on all data tracks from inner data tracks to outer ones. On each data track 101, as shown in FIG. 3(B), a plurality of data regions 105 adjacent to the servo sectors 103 are provided in a circumferential direction of the magnetic disk 11, and the servo sectors 103 and the data regions 105 are arranged alternately in the circumferential direction of the magnetic disk 11.

Each data region 105 has an "n" number of sectors formatted therein. Each sector has a 512-byte data block that functions as a user data-recording region and becomes a unit of reading/writing. The data pre-written in each sector includes a preamble for gain adjustment and synchronization of a read/write channel (R/W channel) during user data recording, a SYNC pattern code for detecting a header of user data during reading, and an error correction code (ECC) for data-reading error compensation.

A user-inaccessible system region is defined inside the recording face of the magnetic disk 11. A relocatable defect map (RDM) onto which entries for mapping secondary defective sectors onto alternative sectors will be recorded is stored in the system region. An alternate cylinder table for forming an alternate zone constructed to prohibit use of alternate data tracks is also stored. The alternate zone is a region constructed on part of the recording face of the magnetic disk 11 by a plurality of adjacent data tracks or a plurality of adjacent cylinders, and this region is later detailed herein.

Magnetic heads 15*a* and 15*b* are described below with reference back to FIG. 2. The magnetic heads 15*a* and 15*b*, are provided at positions associated with the recording faces 12*a* and 12*b*, respectively, and both magnetic heads are constructed of an inductive write head and a read head based on GMR. A head support mechanism 17 pivots while supporting the magnetic head 15*a*, 15*b* formed on the slider, and moves the magnetic head 15*a*, 15*b* to a position above a required data track on the recording face 12*a*, 12*b*. The cylindrical storage region formed by two data tracks when the magnetic head 15*a*, 15*b* is positioned above a data track on the magnetic disk by the head support mechanism 17 is referred to as a cylinder. The cylinder is likewise defined, even when the number of recording faces and that of magnetic heads associated therewith further increase.

A voice coil motor (VCM) 19 is constructed of a voice coil mounted on the head support mechanism 17, a voice coil magnet installed on a base of the magnetic disk drive 10, and a voice coil yoke. The VCM 19 drives the head support mechanism 17 by means of an electric current supplied to the voice coil. After receiving a voltage signal from a digital-analog converter (DAC) 23, a VCM driver 21 converts the signal into a driving current of the VCM 19. The DAC 23, after receiving from a micro-processing unit (MPU) 25 a digital signal for positioning the magnetic head 15*a*, 15*b*, converts the signal into an analog voltage signal.

A spindle motor driver 27 has an AD converter and generates a driving current of the spindle motor 13 by using the digital signal received from the MPU 25. A head amplifier 29 amplifies a very weak, analog reading signal that the magnetic head 15*a*, 15*b* has read during reading, and sends the signal to a read/write channel (R/W channel) 31. After receiving a signal from the R/W channel 31 during writing, the head amplifier 29 also amplifies the received signal and sends the signal to the magnetic head 15*a*, 15*b*.

The R/W channel 31 conducts data processing for reading or writing. Write digital data that has been sent from a host computer 55 is further sent to the R/W channel 31 via a hard-disk controller (HDC) 33. The R/W channel 31 converts the received digital data into a writing current and sends the current to the head amplifier 29. The reading signal of the magnetic head 15*a*, 15*b*, that has been sent from the head amplifier 29 is also converted into digital data by the R/W channel 31, from which the data is then sent to the host computer 55 via the HDC 33. A servo controller 37 extracts head position information from the readout data that the R/W channel 31 outputs, and sends the information to the MPU 25 and the HDC 33.

The HDC 33 functions as an interface for communication with the host computer 55, and adjusts a rate of data transfer to/from the host computer 55 and a data-processing rate within the magnetic disk drive 10. The HDC 33 temporarily stores into a buffer 35 the transfer data received from the host computer 55, and sends the data to the R/W channel 31 in accordance with a command from the MPU 25. Additionally, the HDC 33 temporarily stores into the buffer 35 the transfer data received from the R/W channel 31, and sends the data to the host computer 55 in accordance with a command from the MPU 25. Furthermore, the HDC 33 has an ECC-based data error correction circuit, an address mark detection circuit, and other elements. Moreover, the HDC 33 includes a register to perform data communications with the host computer 55.

The MPU 25 works together with the HDC 33 to conduct total operation control of the magnetic disk drive 10. The MPU 25 directly accesses various registers of the HDC 33 and controls data transfer between the host computer 55 and the magnetic disk drive 10. The MPU 25, after receiving a logical block address (LBA) of the magnetic disk 11 from the host computer 55, refers to the alternate cylinder table and converts the LBA into a CHS parameter including a cylinder number, a head number, and a sector number. The MPU 25 also refers to the RDM and calculates addresses of alternative sectors for secondary defective sectors.

The MPU 25 judges a current position of the magnetic head 15 in accordance with the servo information sent from the servo controller 37. The MPU also sends to the digital-analog converter (DAC) 23 a digital signal for moving the magnetic head 15a, 15b to a target position in accordance with a particular difference between the current position of the magnetic head and the target position calculated from the address specified from the host computer 55.

Programs on a system of the magnetic disk drive 10 are stored into a read-only semiconductor memory 41 (hereinafter, referred to simply as the ROM). The alternate cylinder table and the RDM may also be stored into the ROM 41. Random access memory (RAM) 39 is a main storage device used to temporarily store the programs that the MPU 25 executes, and used as a work region for the MPU 25. While the magnetic disk drive operates, a table for converting the LBA into the CHS parameter and the RDM are temporarily stored into the RAM 39. The alternate cylinder table is also temporarily stored into the RAM 39 so that the MPU 25 can refer to the table.

The host computer 55 is an electronic unit that uses the magnetic disk drive 10 as an external storage device or an auxiliary storage device. The host computer 55 exchanges data with the magnetic disk drive 10 by being connected to an interface connector 47 under an interface scheme compliant with ATA (AT Attachment), SCSI (Small Computer System Interface), or other standards. The host computer 55 according to the present embodiment takes a special form of recording in such a magnetic disk drive as used in a car navigation system or a POS system. More specifically, the host computer 55 stores into the magnetic disk drive 10 both data that is not updated over a long period of time, and data that is frequently updated.

While an example of a block diagram of the magnetic disk drive 10 according to an embodiment of the present invention has been shown above, the names, functions, correlation, and other factors of the blocks described with reference to the accompanying drawings are shown only by way of example. The philosophy of the present invention is not limited to/by the above, and adding other functions, realizing the same function between different blocks, and splitting or integrating each block are embraced in the scope of the invention, provided that a person skilled in the art can implement these with reference to this Specification.

Configuration of the Magnetic Disk

Figure 3:
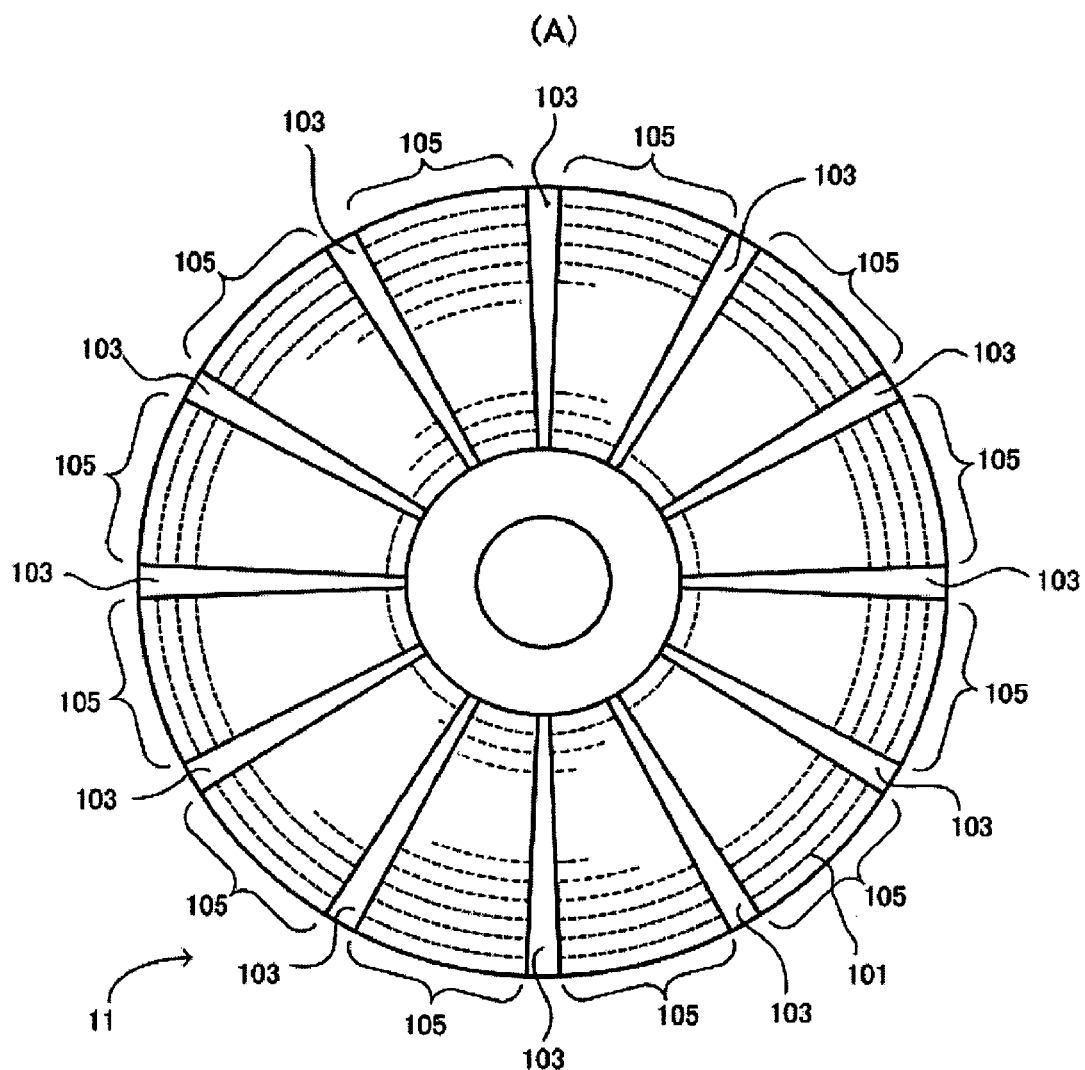
FIG. 3 is a diagram explaining the formatting of a magnetic disk.
Figure 3:
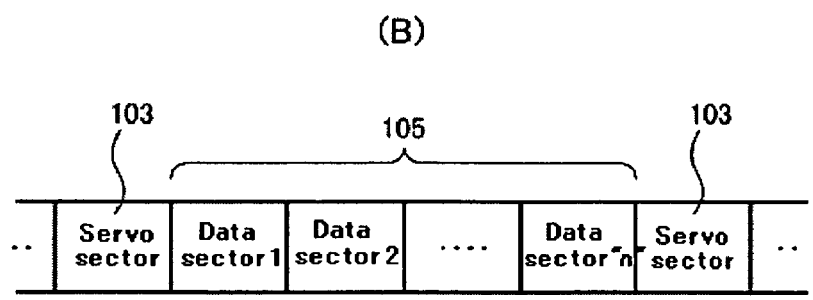
Figure 4:
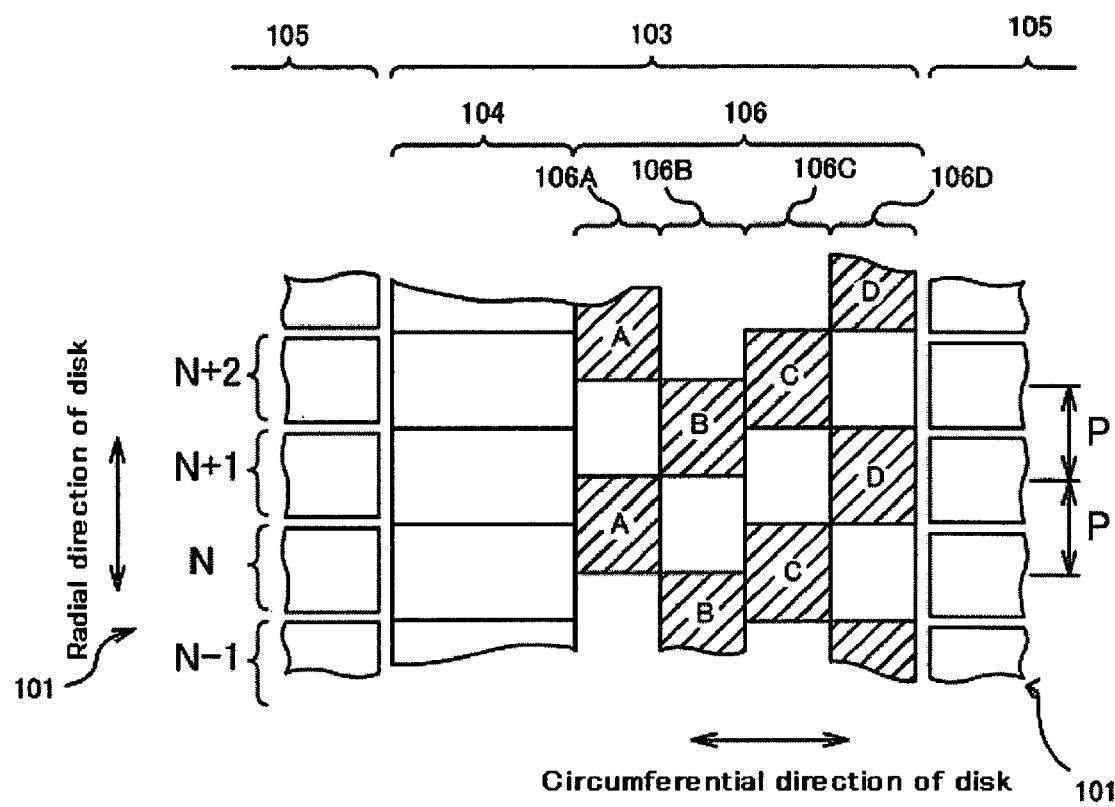
FIG. 4 is an enlarged view of the magnetic disk format.

FIG. 4 is a partially enlarged view of the format of the magnetic disk 11, shown in FIG. 3 Data tracks N−1, N, N+1, and N+2 that are defined in the data region 105, and the servo sectors 103 arranged adjacently to these data tracks, in the circumferential direction of the magnetic disk 11, are shown in FIG. 4. Each servo sector 103 is constituted by an identification information region 104 and a burst pattern region 106. Main burst pattern arrays 106A, 106B, and sub-burst pattern arrays 106C, 106D, are provided in a radial direction of the magnetic disk 11 along its surface, in the burst pattern region 106. The burst pattern arrays 106A, 106B, 106C, and 106D are constructed of the patterns A, B, C, and D, respectively, and those are written such that a radial dimension, of the magnetic disk 11 takes the same value.

The main burst pattern arrays 106A and 106B are written at the position where phases of associated reading signals shift through 180 degrees with respect to each other when the magnetic head moves in the radial direction of the magnetic disk 11. These burst pattern arrays constitute the main burst patterns. The sub-burst pattern arrays 106C and 106D are also written at the position where phases of associated reading signals shift through 180 degrees with respect to each other when the magnetic head moves in the radial direction of the magnetic disk 11. These burst pattern arrays constitute sub-burst patterns.

The main burst patterns and the sub-burst patterns are written so that the phases of the respective reading signals are maintained in a mutually 90-degree shifted relationship. A radial dimension of each burst pattern on the disk, namely, a burst pattern pitch is equal to data track pitch P and almost equal to a width of each data track 101. A servo sector starting code is recorded at the beginning of the identification information region 104. A gray code (cyclic binary code) indicative of a data track identification number, a code denoting a. physical identification number of each servo sector 103, and other servo sector identification information are recorded in the identification information region 104.

In this way, a data track group consisting of plural adjacent data tracks 105 is defined as a data-recording region concentrically between the innermost data track and the outermost data track by servo data. A pitch or width of the data tracks defined by servo data in the present embodiment may be constant in all zones from the innermost data track to the outermost one. Alternatively, the data track pitch or width may be changed by separating each zone in the radial direction of the magnetic disk or may change progressively in order from the innermost data track to the outermost one. In the present embodiment, an alternate zone comprised of data tracks to be used and data tracks whose usage is to be prohibited, is set for the format of the initially defined in this way.

Servo data is written onto the magnetic disk 11 during a manufacturing stage of the magnetic disk drive 10 by use of a known method. When no defects exist in the sectors on each recording face of the magnetic disk 11, all the sectors included in all data tracks can be used to record data. Hereinafter, the addresses allocated to the data tracks at that time in order of arrangement thereof are called the absolute addresses. Each absolute address is determined by the arrangement of the data tracks formatted during the manufacturing stage.

However, the data tracks are constructed so that when the recording medium is inspected for defects during an inspection process for the magnetic disk drive, if any track-by-track defects are detected, the absolute address of the defective data track is registered in a primary defect map (PDM) to prohibit use of the track. Track-by-track defects are due mainly to defects in the servo data. If any track-by-track defects are detected, the defects may be registered for each cylinder. In the present embodiment, in addition to these concepts, an alternate cylinder table is reserved in a special region on the magnetic disk, entries are recorded, and when the magnetic disk drive 10 operates, associated data is read out into the RAM 39 to allow reference by the MPU 25 for address calculation.

Configuration of the Alternate Zone

An example of an alternate cylinder table configuration is shown in FIG. 5. Although cylinders each comprised of plural data tracks, not the data tracks themselves, are described hereunder, the alternate cylinder table can also be constructed as an alternate track table intended for tracks. The alternate cylinder table is used for mapping absolute addresses and logical addresses of cylinders and for forming an alternate zone in accordance with the magnetic disk 11. The alternate zone is a storage region set on the magnetic disk 11 and intended for a host computer taking a special form of data recording. The alternate zone is also a storage region set to store data not updated too frequently and the data updated very frequently.

The absolute addresses of cylinders are allocated in order of the cylinder arrangement predefined by servo data. The logical addresses of the cylinders are allocated sequentially in accordance with the arrangement of the cylinders actually used for data storage. In FIG. 5, a specific absolute address from #0 to #9 is assigned to each of 10 cylinders arranged in order, and a flag can be set up at each absolute address. The flag is used to exclude the cylinder predefined by the absolute address, from the logical address. In the alternate cylinder table of FIG. 5, the flag is set up at the #1, #3, #5, #7, and #9 absolute addresses of the cylinders in order to form an alternate zone in the cylinder range from #1 to #9, on the magnetic disk 11.

In this case, the magnetic disk drive is internally programmed so that the MPU 25 sequentially allocates logical addresses to the cylinders while skipping the cylinders each having a set flag. Therefore, the absolute addresses and the logical addresses have a relationship of #2-#1, #4-#2, #6-#3, #8-#4, and every other cylinder is skipped when the cylinders each arranged with an absolute address are actually used. This means that although the #1, #3, #5, #7, and #9 cylinders skipped are formatted on the magnetic disk 11, these cylinders are not used as storage regions thereof. More specifically, when allocating LBA to each sector arranged on each recording face of the magnetic disk 11, the MPU 25 ignores the cylinders each having a set flag, whereby use of these cylinders is prohibited. Hereinafter, the skipped #1, #3, #5, #7, and #9 cylinders are called blind cylinders. When expressed in terms of tracks, blind cylinders are equivalent to blind tracks.

The alternate cylinder table may be shared with a table for registering the defective cylinders detected during an inspection process for the magnetic disk 11. In this case, defect-registered cylinders can be used to form alternate zones. For example, if the cylinder with absolute address #3 is a defective cylinder that was detected during the inspection process, and the #3 cylinder is already registered with a set flag in the alternate cylinder table, this cylinder may be directly used to form an alternate zone. If the cylinder with absolute address #4 is a defective cylinder that was detected during the inspection process, and the cylinder is already registered with a set flag in the alternate cylinder table, the cylinders with the #0, #2, #6, #8 absolute addresses may be used as blind cylinders by setting up the flag additionally for each of these cylinders.

The alternate zone can be constructed of at least one valid data track (or valid cylinder) for recording the data updated with high frequency, and two blind tracks (or blind cylinders) adjacent to both sides of the valid track (or valid cylinder). If the data updated with high frequency is to be stored onto the outermost cylinder or the innermost cylinder, the alternate zone can be constructed of one blind cylinder adjacent internally or externally to that cylinder. However, as shown in the present embodiment, constructing an alternate zone with multiple adjacent data tracks or cylinders, rather than with one fixed data track or cylinder to be used as the storage region for the data updated very frequently, is convenient for minimizing restrictions on flexibility of application programming in a host apparatus.

It is also desirable that if this is easily possible, an internal application program of the host apparatus be recordable in the magnetic disk drive in the state where the programs are clearly divided into ones for the data updated very frequently and ones for data not updated too frequently. It would then be possible to divide a recording region of the magnetic disk into a region including the data tracks allocated for recording the data updated very frequently, and a region including the data tracks allocated for recording data not updated too frequently, and provide one track of space, as a blind track or a blind cylinder, between the regions or sections. As a matter of fact, however, it may become difficult for the application program to completely set the updating frequency of the data recorded on each data track. Accordingly, the data updated very frequently may be recorded in the data track region for data not updated too frequently, or conversely, data not updated too frequently may be recorded in the data track region for the data updated very frequently. As a result, ATI may occur since the data updated very frequently and data not updated too frequently may be recorded on adjacent data tracks. However, since the alternate zone is a recording region where ATI does not occur even if the above two types of data are mixedly recorded, application programs can also be conveniently used in this respect.

Figure 6:
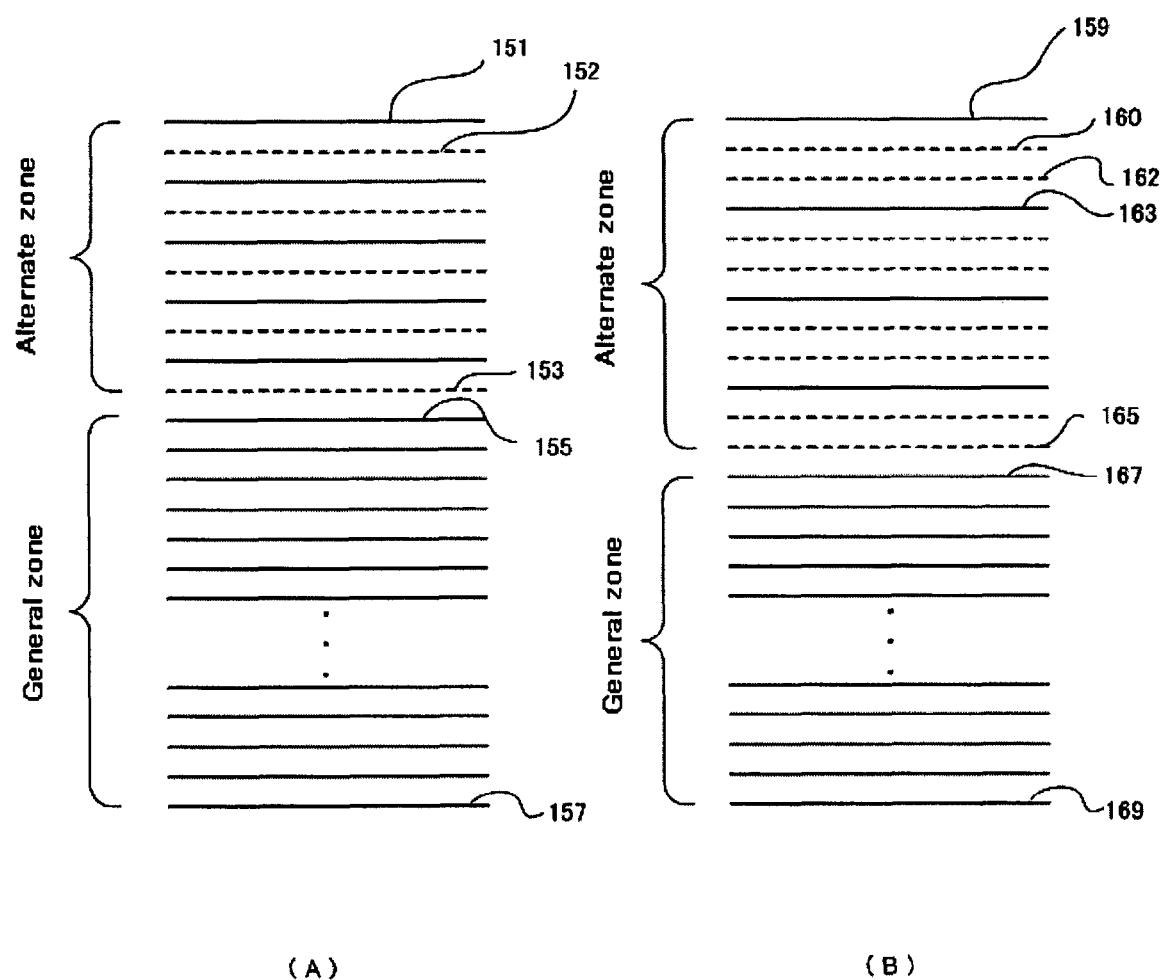
FIG. 6 is a diagram explaining the format of data tracks in an alternate zone.

FIGS. 6(A) and 6(B) are diagrams that explain data track formats of different alternate zones. FIG. 6(A) shows a data track format of the alternate zone formed by setting up a flag for every other adjacent cylinder in an alternate zone table. The region comprised of physically adjacent multiple data tracks from the outermost data track 151 to a data track 153 is the alternate zone. Data track 152 shown with a dotted line is a blind track. The valid data tracks 151 and 152 used for data recording are arranged in alternate positions as the data tracks included in the alternate zone.

A section from a data track 155 to the innermost data track 157 is a general zone. In the general zone, although defective cylinders or defective sectors are prohibited from being used, all other cylinders or sectors form the valid data tracks used to record data. Although the alternate zone has an alternate arrangement with valid data tracks and a blind zone, the general zone does not take such an arrangement.

The alternate zone shown in the example of FIG. 6(B) is comprised of adjacent multiple data tracks from the outermost data track 159 to a data track 165. In this example, a blind cylinder set is formed by setting up a flag for each of two adjacent data tracks, 160 and 162, in the alternate cylinder table, and the blind cylinder set is disposed between valid data tracks 159 and 163. The blind cylinder set may be constructed of three or more adjacent cylinders. Forming two or more blind cylinder sets for wider intervals between valid cylinders also provides adaptability to a recording form in which data is updated even more frequently. A section from a data track 167 to the innermost data track 169 is used as the same general zone as that of FIG. 6(A).

In the currently known usage form of host apparatus, the storage capacity required of the alternate zone is about 0.05% of the overall storage capacity of the magnetic disk 11. The storage capacity of the alternate zone, however, can be changed according to the recording form actually used for the host apparatus. The host apparatus having the current special form of recording usually needs to have an alternate zone near the outermost data track of the magnetic disk or near the innermost data track thereof. For the magnetic disk 11, therefore, the alternate zone is preferably set up in the range defined by a required number of cylinders from the outermost data track or innermost data track of the magnetic disk. While each data track whose usage is to be prohibited has a flag set up in an alternate cylinder table to form an alternate zone, the flag may be set up for each data track that is to be used.

Such a magnetic disk drive is suitable for use in the host apparatus of a car navigation system, a POS system, a surveillance camera system, or the like. In such host apparatus, if which data tracks or cylinders on the magnetic disk are to be used to record the data updated very frequently is known beforehand, that region may be set in the alternate zone when the magnetic disk drive is manufactured.

For recording the data updated very frequently, the host apparatus sends a write command to the magnetic disk drive so that the logical address of any data track or cylinder in the alternate zone should be specified. For recording data not updated too frequently, the host apparatus can specify the logical address of any data track or cylinder present in the alternate zone or the general zone, without distinguishing the two zones. When data likely to be updated very frequently is recorded on either cylinder of the alternate zone and data unlikely to be updated too frequently is recorded on any other cylinder of the alternate zone, since there is always one cylinder interval of blank space between valid cylinders, data loss from adjacent data tracks due to ATI does not result, irrespective of how high the updating frequency of the data is.

The formation of an alternate zone reduces the storage capacity of the magnetic disk. However, since the alternate zone can be easily formed just by setting up flags in the alternate cylinder table, modification of the magnetic disk drive according to the special recording form adopted for the host apparatus is possible immediately before the disk drive is shipped. If no flags are set up, therefore, the magnetic disk drive can be shipped for use in general applications such as a personal computer, without causing a decrease in the storage capacity of the magnetic disk drive. The method of preventing ATI according to the present embodiment can be realized easily, compared with a method that requires spreading a guard band or expanding a data track pitch, and allows flexible application to the forms of use for general purposes and special purposes.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic disk drive for use with a host apparatus in which data of low updating frequency and data of high updating frequency are recorded, said magnetic disk drive comprising:
   a magnetic disk having a data track group which includes a plurality of data tracks arranged adjacently to one another, from the innermost data track to the outermost data track;
   a look-up table having an alternate zone formed on said magnetic disk by, with respect to plural adjacent data tracks selected from the data track group, setting usage prohibition for every other data track, wherein the usage-prohibited data tracks are not used for data recording; and
   a processor that refers to said look-up table, skips the usage-prohibited data tracks by executing a write command sent from the host apparatus in order to record the data of low updating frequency, and a write command sent from the host apparatus in order to record the data of high updating frequency, and writes the data of low updating frequency and the data of high updating frequency onto data tracks of the alternate zone.

2. The magnetic disk drive according to claim 1, wherein said processor, by executing a write command for recording the data of low updating frequency, writes the data onto data tracks included in the data track group, except for the data tracks of the alternate zone on said magnetic disk.

3. The magnetic disk drive according to claim 1, wherein the alternate zone is comprised of a required number of data tracks arranged adjacently to one another, the data tracks extending from the outermost data track of said magnetic disk, toward the innermost data track thereof.

4. The magnetic disk drive according to claim 1, wherein the alternate zone is comprised of a required number of data tracks arranged adjacently to one another, the data tracks extending from the innermost data track of said magnetic disk, toward the outermost data track thereof.

5. The magnetic disk drive according to claim 1, wherein said magnetic disk has a plurality of recording faces and wherein the alternate zone is formed as a cylinder constructed of data tracks present on each recording face.

6. The magnetic disk drive according to claim 1, wherein the host apparatus is any apparatus selected from the group consisting of a car navigation system, a point of sale (POS) system, and a surveillance camera system.

7. A magnetic disk drive for use with a host apparatus in which data of low updating frequency and data of high updating frequency are recorded, said magnetic disk drive comprising:
   a magnetic disk with a plurality of data tracks each having an absolute address allocated in order of physical arrangement;
   an alternate cylinder table having blind tracks generated by, with respect to absolute addresses of the data tracks, setting up a flag for every other absolute address, wherein the blind tracks are not used for data recording;
   a recording medium for storing said alternate cylinder table; and
   a processor that refers to the flag set up in said alternate cylinder table, skips the blind tracks by executing a write command sent from the host apparatus in order to record the data of low updating frequency, and a write command sent from the host apparatus in order to record the data of high updating frequency, and writes the data of low updating frequency and the data of high updating frequency onto data tracks of alternate zone.

8. The magnetic disk drive according to claim 7, wherein a plurality of blind track sets are formed by setting up the flag for both of two adjacent data tracks in the alternate zone, and one data track for which the flag is not set up is provided between each of the blind track sets.

9. The magnetic disk drive according to claim 7, wherein said alternate cylinder table has a flag for setting a defective data track as a blind track.

10. The magnetic disk drive according to claim 7, wherein said magnetic disk has a plurality of recording faces and wherein the alternate zone is formed as a blind cylinder constructed of blind tracks present on each recording face.

11. The magnetic disk drive according to claim 10, wherein said alternate cylinder table has a flag for setting a defective cylinder as a blind cylinder.

12. The magnetic disk drive according to claim 7, wherein said processor allocates logical addresses to the plural data tracks in order while skipping data tracks for which the flag is set up in said alternate cylinder table.

13. A recording method in which a host apparatus records data of low updating frequency and data of high updating frequency in a magnetic disk drive, said method comprising:

setting up an alternate zone in which data tracks for recording data in part of a storage region on a magnetic disk of the magnetic disk drive, and blind tracks not used for data recording, are arranged, one by one, in alternate positions;

a first recording step of writing the data of low updating frequency onto data tracks of the alternate zone by executing, while skipping the blind tracks, a write command sent from the host apparatus in order to record the data of low updating frequency;

a second recording step of writing the data of high updating frequency onto other data tracks of the alternate zone by executing, while skipping the blind tracks, a write command sent from the host apparatus in order to record the data of high updating frequency.

14. The recording method according to claim 13, wherein said first recording step includes writing the data of low updating frequency Onto data tracks other than data tracks of the alternate zone.

15. The recording method according to claim 13, wherein setting the alternate zone includes the step of setting defective data tracks as blind tracks.

16. The recording method according to claim 13, wherein the alternate zone is comprised of a required number of data tracks arranged adjacently to one another, the data tracks extending from the outermost data track of said magnetic disk, toward the innermost data track thereof.

17. The recording method according to claim 13, wherein the alternate zone is comprised of a required number of data tracks arranged adjacently to one another, the data tracks extending from the innermost data track of said magnetic disk, toward the outermost data track thereof.

18. A magnetic disk drive for use with a host apparatus in which data of low updating frequency and data of high updating frequency are recorded, said magnetic disk drive comprising:

a magnetic disk;

a look-up table in which data tracks for recording data in part of a storage region on said magnetic disk, and blind tracks not used for data recording, are set so as to be arranged, one by one, in alternate positions;

a recording medium for storing said look-up table;

a processor configured to control said magnetic disk drive; and a program stored within said magnetic disk or said recording medium, said program being readable by said processor;

wherein said program is executable by said processor to perform:

a first recording step of writing the data of low updating frequency Onto data tracks of alternate zone by executing, while skipping the blind tracks, a write command sent from the host apparatus in order to record the data of low updating frequency; and a second recording step of writing the data of high updating frequency Onto other data tracks of the alternate zone by executing, while skipping the blind tracks, a write command sent from the host apparatus in order to record the data of high updating frequency.

19. A host apparatus with a mounted magnetic disk drive and for recording data of low updating frequency and data of high updating frequency, wherein the magnetic disk drive is the magnetic disk drive according to claim 18.

20. The magnetic disk drive according to claim 18, wherein said first recording step includes writing the data of low updating frequency onto data tracks other than data tracks of the alternate zone.

21. The magnetic disk drive according to claim 18, wherein defective data tracks are set as blind tracks in said look-up table.

* * * * *